Figure 3:
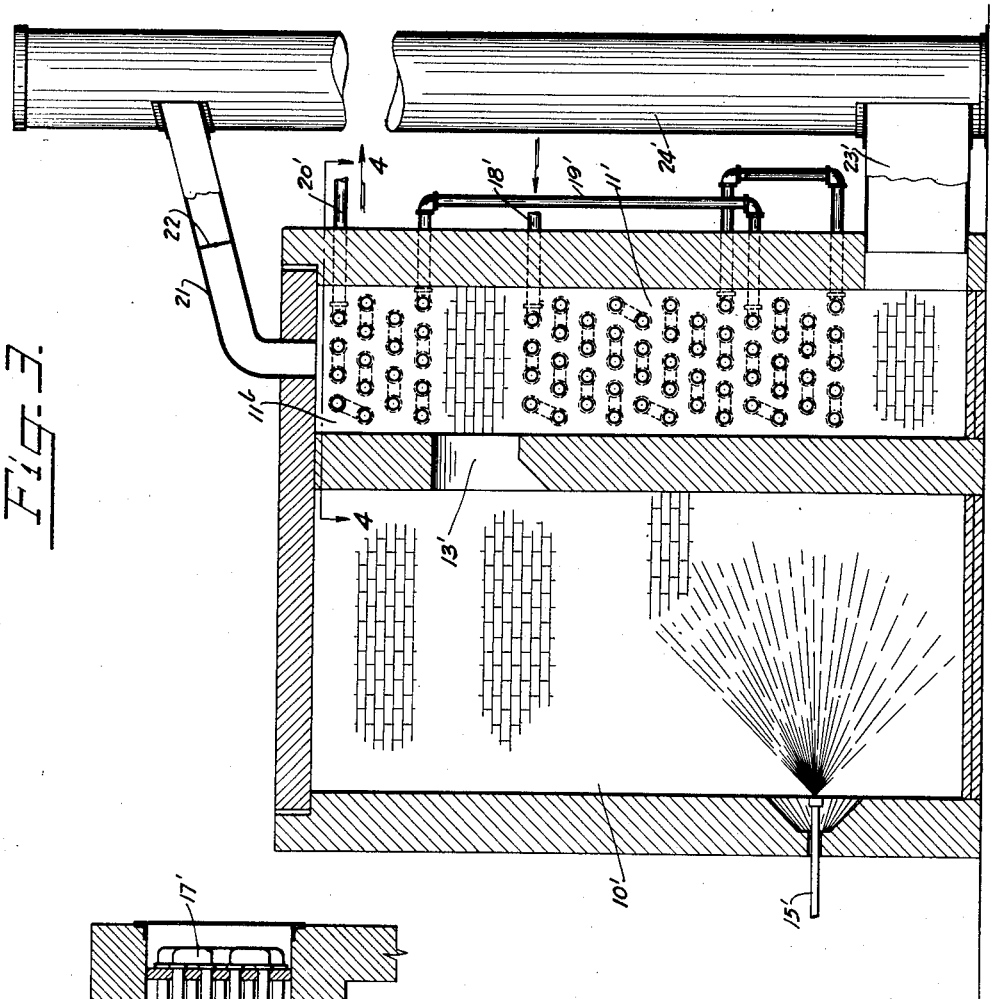

Aug. 8, 1933.  B. BROIDO ET AL  1,921,603
METHOD AND APPARATUS FOR CRACKING OILS
Filed Nov. 4, 1926  2 Sheets-Sheet 1
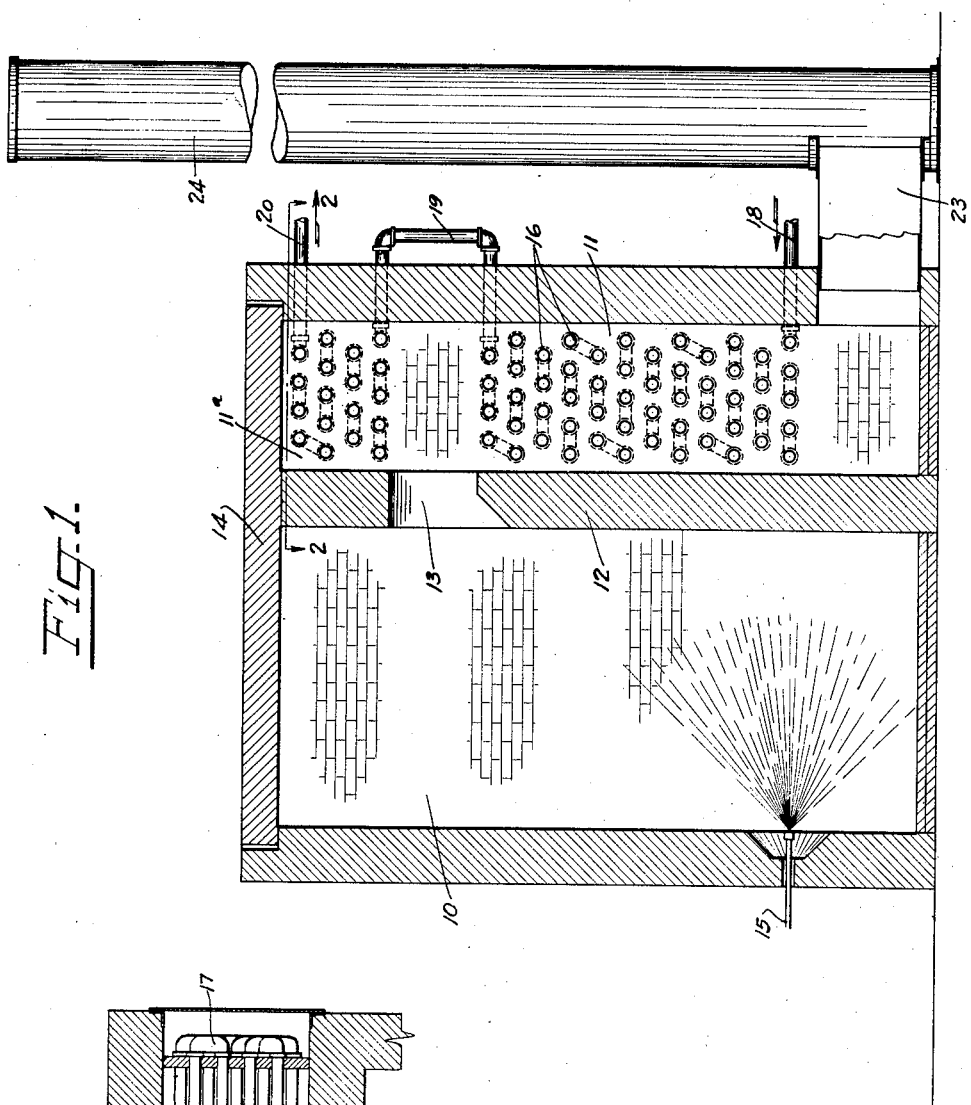
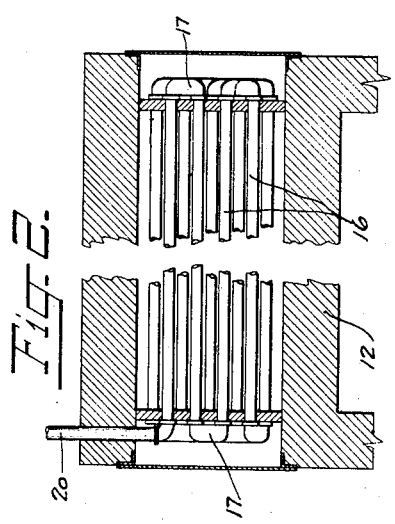
BENJAMIN BROIDO, INVENTORS.
JOHN R. LEVALLY.
BY
C. V. Thiele
ATTORNEY.

Aug. 8, 1933.  B. BROIDO ET AL  1,921,603
METHOD AND APPARATUS FOR CRACKING OILS
Filed Nov. 4, 1926   2 Sheets-Sheet 2

BENJAMIN BROIDO. INVENTORS.
JOHN. R. LE VALLY.
BY
O. V. Thiele
ATTORNEY.

Patented Aug. 8, 1933

1,921,603

UNITED STATES PATENT OFFICE 1,921,603

METHOD AND APPARATUS FOR CRACKING OILS

Benjamin Broido, New York, N. Y., and John R. Le Vally, Pittsburgh, Pa., assignors to The Superheater Company, New York, N. Y.

Application November 4, 1926. Serial No. 146,160

9 Claims. (Cl. 196—110)

Our invention relates to the cracking of oils and has particular reference to a process and apparatus for the continuous treatment of such oils in a pipe still.

Heretofore the continuous cracking process has been carried out in numerous forms of pipe stills through which the oil has been passed and in some of the prior known processes it has been recognized that in order to secure the maximum decomposition or cracking of the oil it must be held within a certain temperature range for a period of time. The time during which the oil was held at the cracking temperature has been considered a primary factor in the efficiency of the process, and in order to hold the oil above the minimum cracking temperature for the length of time desired, it has been the general previous practice to heat the oil to a temperature considerably above that of the minimum cracking temperature and then allow the oil to pass through some form of reaction chamber in which the decomposition of the oil was accomplished, the temperature of the oil during its passing through the reaction chamber dropping from its initial high temperature to a temperature near the minimum of the cracking range.

The reactions incident to the cracking of the oil are of a heat absorbing nature, and the heat necessary to support these reactions has been in the prior processes supplied by the excess heat imparted to the oil during its period of heating in the still. For example, assuming that the most desirable cracking temperature for a given oil is from 840 to 850 deg. F., the oil has in the past been heated to the neighborhood of 940 deg. before being passed to the reaction chamber and during the passage through the latter, this excess heat was used to support the reactions incident to cracking, the oil emerging from the reaction chamber at a temperature approximating its best cracking range.

This process of cracking is disadvantageous in that the heating of the oil to a temperature materially above the cracking temperature results in such breaking down of the oil that comparatively large quantities of fixed carbon and gases are produced. Furthermore, the oil during a large part of the time it is in the reaction chamber is at a temperature above its best cracking range, which lengthens the time necessary in order to complete the reactions. The time required in the reaction chamber to produce the results desired is also lengthened by the fact that the heat necessary to support and complete the reactions, being supplied by the oil itself, is absorbed at a comparatively slow rate.

We have discovered that the time element heretofore considered necessary for the proper cracking of the oil may be materially reduced if the oil is held during the entire cracking period at its best cracking temperature, and sufficient heat added to the oil from an outside source to allow the reactions incident to cracking to proceed with their maximum rapidity.

The principal object of our invention is, therefore, the provision of a method by which the oil to be cracked is heated to the most desirable cracking temperature, and is thereafter maintained at a constant temperature during the cracking period by the addition of sufficient heat to support the reactions taking place. A further object of the invention is the provision of apparatus by means of which the process may be carried into effect. Further and more detailed objects of the invention will appear more fully in connection with the following description of the preferred embodiments of the apparatus by means of which the invention may be carried into effect.

Figure 4:
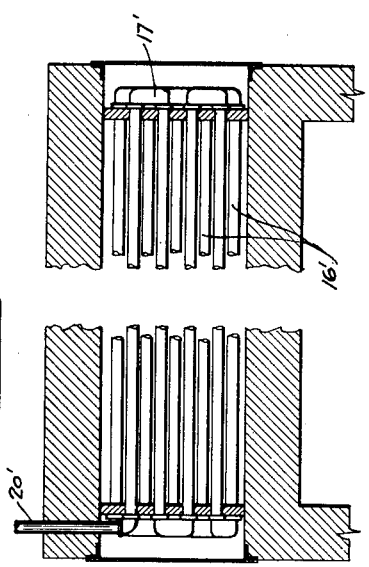

In the accompanying drawings Figure 1 is a vertical section taken through a pipe still embodying our invention. Fig. 2 is a horizontal section taken on the line 2—2 of Fig. 1, Fig. 3 is a view similar to Fig. 1 of a slightly different form of still, and Fig. 4 is a horizontal section taken on the line 4—4 of Fig. 3.

Referring now to Fig. 1, the apparatus illustrated comprises a setting divided into a furnace and combustion chamber 10 and a heating chamber 11 divided by a vertical dividing wall 12 having a port 13 therein located in the upper portion of the wall but a substantial distance below the line of the roof 14. Heat is generated in the furnace 10 by means of any suitable means such as the oil burner 15 illustrated, and the combustion gases pass from the furnace through the port 13 and downwardly through the heating chamber 11 to the breeching 23 and stack 24. It is to be particularly noted that in this form of construction the upper portion 11a of the heating chamber 11 is out of the line of flow of the gases through the still but is in such position as to receive a considerable quantity of heat by radiation from the gases as they pass through the port 13 and into the chamber 11.

The specific arrangement of the heating coils in the chamber 11 below the level of port 13 is not material to the present invention, and is subject to considerable variation within the scope thereof. For purposes of illustration, we have shown the ordinary form of zig-zag continuous coil comprising a plurality of pipes 16 mounted transversely of the gas path through chamber 11 and serially connected by suitable return bends 17. In the form shown the inlet 18 of the heating coil is placed at the bottom of chamber 11 so that the flow of oil through the coil is counter to the flow of gases thereover. The upper portion of the coil terminates at or near the bottom level of the port 13 and the coil is then continued to form a second section located between the roof of the still and a point approximately at the upper level of the port 13. The two sections of the heating coil are connected in series, preferably by means of a connecting section 19 outside the zone of the combustion gases, although this location is not necessary, and if desired the connection between the two sections of the heating coil may be made within the chamber 11. The upper section of the heating coil as illustrated is of the same zigzag form as the lower, and terminates in an outlet 20 at the top of the still.

In order to carry out the process contemplated by the invention, the furnace and heating chambers of the still and the lower portion of the heating coil are so proportioned that the oil after passing through the lower section of the heating coil is discharged therefrom at a temperature within the range most effective for cracking the particular oil being treated. The oil then passes through the upper section of the heating coil which, as previously noted, is located in a chamber forming a relatively dead pocket, that is, a pocket out of the direct line of flow of the combustion gases. The oil during its passage through the second section of the coil is at a temperature at which cracking is most effectively carried on, and during this time considerable heat is required to support the heat absorbing reactions taking place. This heat is supplied in the structure illustrated by radiation from the incandescent gases passing from the furnace chamber to the heating chamber, and the upper portion of the coil is so proportioned, in accordance with well-known principles of heat transmission, that the amount of heat supplied by radiation and such convection as may take place is just sufficient to hold the oil passing through this part of the coil at the desired cracking temperature.

Because of the high temperature difference between the furnace gases and the oil, a rapid rate of heat transfer is obtained and the reactions incident to the cracking of the oil are completed with comparative rapidity, particularly as during this period the oil is maintained at its most effective cracking temperature. It is further to be noted that in carrying out the process the oil is passed through the upper heating coil at substantially the same velocity as that existing in the main heating coil. This aids in increasing the rate of heat transfer to the oil, which results in a shortening of the time necessary for this phase of the process and moreover minimizes the deposition of fixed carbon from the oil in the tubes of the coil.

In Fig. 3 we have shown a slightly modified form of still in which the furnace chamber 10', heating chamber 11', port 13', breeching 23' and stack 24' are substantially the same as those described in connection with Fig. 1.

The manner in which the oil is initially heated is in this form slightly different from that previously shown, with the oil inlet 18' placed just below the port 13 so that the flow of the oil through the initial portion of the coil is in the same direction as the flow of the furnace gases. At the bottom of the heating coil, the flow is counter to the flow of the gases for a short distance, and the outlet from the lower section of the coil is considerably below the port 13'. From the outlet of the lower section of the heating coil, the oil is conveyed through connection 19' to an upper heating coil located in chamber 11b, the construction of this latter coil being the same as that previously described, with the inlet approximately at the level of the upper portion of the port 13', and with the outlet 20' located at the top of the still. A bypass 21 is provided connecting the top of the chamber 11b with the stack 24' and this bypass is provided with an adjustable damper 22 by means of which the amount of gas bypassed to the stack may be controlled.

In general, the operation of the still illustrated in Fig. 3 is the same as that shown in the form of Fig. 1, but in order to adapt the still to varying grades and types of oils, the bypass 21 is provided so that in addition to the heat absorbed by radiation additional heat may be delivered to the upper section of the heating coil by gases allowed to pass over this section of the coil and through the bypass 21.

It will be readily apparent from the foregoing description that the essential feature of the process embodying our invention is the addition of only enough heat to the oil after it has reached its cracking temperature to maintain it at a substantially constant temperature until the reactions incident to cracking have taken place, and while we have illustrated two preferred forms of apparatus for carrying this object into effect, it is readily apparent that many variations in the details of the constructions shown may be made, resulting in equivalent structures. For example, in order to regulate the amount of heat added to the oil in the upper section of the heating coil, this section of the coil may be made with sufficient heat absorbing capacity to handle oils requiring the maximum amount of heat in this phase of the process, and equipped with means whereby one or more of the individual coils may be cut out in case an oil requiring a less amount of heat during this phase is being treated.

While both process and apparatus have been described in connection with the cracking of oils, it will be readily apparent that our invention is equally applicable to the treatment of any fluid which requires for its treatment the addition of heat at an elevated temperature in order to support heat absorbing reactions, and our invention is, therefore, not to be limited by the foregoing description which is to be taken as illustrative only, but is to be considered as embracing all within the scope of the appended claims.

We claim:

1. In the art of cracking oil or the like, the process which consists in heating a continuously flowing stream of oil substantially to a predetermined cracking temperature by transferring heat thereto from a stream of heating gases, and thereafter maintaining it substantially constantly at that temperature until cracking is completed by the addition of heat by transferring heat to said oil stream from substantially stagnant gases taken from said gas stream.

2. In apparatus of the class described, the combination with a heating chamber having a gas inlet, a gas outlet and a pocket located adjacent to the inlet on the side opposite the outlet, of a heating coil comprising serially connected sections in said chamber, one of said sections comprising a plurality of rows of tubes located between said inlet and said outlet, and the other of said sections comprising a plurality of rows of tubes located in said pocket on the side of said inlet opposite said first-named section.

3. In apparatus of the class described, the combination with a heating chamber having a gas inlet and a gas outlet, of a heating coil comprising an inlet section and an outlet section located in said chamber, each of said sections comprising a plurality of rows of tubes, said inlet section being located between said gas inlet and said gas outlet, and said outlet section being located on the side of said gas inlet opposite said inlet section.

4. In apparatus of the class described, the combination of an elongated heating chamber, a combustion gas outlet at one end thereof, a lateral combustion gas inlet intermediate the ends of said chamber, oil heating means comprising a plurality of serially connected tubes arranged in two sections each of which comprises a plurality of tube rows, with one section located on one side of said inlet and the other section located on the other side of said inlet, means for supplying combustion gases to said chamber through said inlet, said sections being connected so that oil is first passed through the section located between the gas inlet and the gas outlet and then through the other section.

5. In apparatus of the class described, a setting, a vertical wall having a port in the upper portion thereof, said wall dividing said setting into a furnace and a heating chamber, an outlet at the bottom of said chamber, a heating coil comprising serially connected sections, each of said sections comprising a plurality of rows of tubes, one of said sections being located in said chamber below said port and the other of said sections being located in said chamber above said port.

6. In apparatus of the class described, the combination with a heating chamber having an inlet and a pair of outlets, of a heating coil comprising serially connected sections, one of said sections being located in said chamber between said inlet and one of said outlets, and the other of said sections being located in said chamber between said inlet and the other of said outlets, and means for controlling the flow of gas through said last-named outlet.

7. In apparatus of the class described, the combination with a heating chamber having a gas inlet in the upper portion thereof and an outlet adjacent the bottom thereof, of a heating coil located in said chamber, said coil comprising a section located below said gas inlet through which the fluid to be heated flows downwardly, a second section located below said first-named section in which the flow of fluid is upward, and a third section located above said gas inlet in which the flow of fluid is upward.

8. In apparatus of the class described, the combination of a vertically elongated heating chamber, a combustion gas outlet at the lower end thereof, a lateral combustion gas inlet intermediate the ends of said chamber, oil heating means comprising a plurality of serially connected tubes arranged in two sections, each of which comprises a plurality of tube rows, with one section located below said inlet and the other section above it, and means for supplying combustion gas to said chamber through said inlet, said sections being connected so that oil is first passed through the section located between the gas inlet and the gas outlet and then through the other section.

9. In the art of cracking oil or the like, the process which consists in heating a continuously flowing stream of oil substantially to a predetermined cracking temperature by transferring heat to said oil stream from the downwardly flowing portion of a continuously flowing stream of combustion gases having rising and descending portions, forming a sluggish gas eddy of gas derived from said gas stream at the top of its path and maintaining said oil stream substantially constantly at said predetermined temperature until cracking is completed by heat transfer from said sluggish eddy.

BENJAMIN BROIDO.
JOHN R. LE VALLY.